United States Patent
Reif et al.

(10) Patent No.: US 11,377,391 B2
(45) Date of Patent: Jul. 5, 2022

(54) REFRACTORY CERAMIC BATCH AND METHOD FOR PRODUCING A REFRACTORY CERAMIC PRODUCT

(71) Applicant: Refractory Intellectual Property GmbH & Co. KG, Vienna (AT)

(72) Inventors: Gerald Reif, Polstal (AT); Milos Blajs, Kapfenberg (AT); Stephan Ully, Graz (AT)

(73) Assignee: REFRACTORY INTELLECTUAL PROPERTY GMBH & CO. KG, Vienna (AT)

(*) Notice: Subject to any disclaimer, the term of this patent is extended or adjusted under 35 U.S.C. 154(b) by 560 days.

(21) Appl. No.: 16/326,365

(22) PCT Filed: Aug. 9, 2017

(86) PCT No.: PCT/EP2017/070164
§ 371 (c)(1),
(2) Date: Feb. 18, 2019

(87) PCT Pub. No.: WO2018/059812
PCT Pub. Date: Apr. 5, 2018

(65) Prior Publication Data
US 2021/0284581 A1    Sep. 16, 2021

(30) Foreign Application Priority Data
Sep. 29, 2016 (EP) .................... 16191343

(51) Int. Cl.
C04B 35/624 (2006.01)
C04B 35/14 (2006.01)
(Continued)

(52) U.S. Cl.
CPC .......... *C04B 35/624* (2013.01); *C04B 35/10* (2013.01); *C04B 35/12* (2013.01); *C04B 35/14* (2013.01);
(Continued)

(58) Field of Classification Search
CPC ....... C04B 35/624; C04B 35/10; C04B 35/12; C04B 35/14; C04B 35/481; C04B 35/565;
(Continued)

(56) References Cited

U.S. PATENT DOCUMENTS 3,428,464 A   2/1969 Pollard
4,378,996 A   4/1983 Yardwood

FOREIGN PATENT DOCUMENTS

CA   749917   *   1/1967
CA   749917 A     1/1967
(Continued)

OTHER PUBLICATIONS

DE102006043535 Machine Translation (Year: 2008).*
"Examination Report for Indian Patent Application No. 201947007439", dated Nov. 24, 2021, 8 pages.

*Primary Examiner* — Karl E Group
*Assistant Examiner* — Cameron K Miller
(74) *Attorney, Agent, or Firm* — Calfee, Halter & Griswold LLP

(57) ABSTRACT

This invention relates to a refractory ceramic batch and to a method for producing a refractory ceramic product.

12 Claims, 1 Drawing Sheet

(51) Int. Cl.
  *C04B 35/10* (2006.01)
  *C04B 35/48* (2006.01)
  *C04B 35/12* (2006.01)
  *C04B 35/565* (2006.01)
  *C04B 35/63* (2006.01)
  *C04B 35/626* (2006.01)
  *C04B 35/64* (2006.01)

(52) U.S. Cl.
  CPC .......... *C04B 35/481* (2013.01); *C04B 35/565* (2013.01); *C04B 35/6264* (2013.01); *C04B 35/6316* (2013.01); *C04B 35/64* (2013.01); *C04B 2235/3217* (2013.01); *C04B 2235/3241* (2013.01); *C04B 2235/3244* (2013.01); *C04B 2235/3418* (2013.01); *C04B 2235/3826* (2013.01); *C04B 2235/96* (2013.01)

(58) Field of Classification Search
  CPC . C04B 35/6264; C04B 35/6316; C04B 35/64; C04B 2235/3217; C04B 2235/3241; C04B 2235/3244; C04B 2235/3418; C04B 2235/3826
  See application file for complete search history.

(56) References Cited

FOREIGN PATENT DOCUMENTS

| | | | |
|---|---|---|---|
| CA | 1216704 A | 1/1987 | |
| CA | 1216704 A1 * | 1/1987 | |
| DE | 102006043535 A1 * | 3/2008 | ............... C03C 8/14 |
| DE | 102011051799 A1 | 1/2013 | |
| EP | 0041394 A2 | 12/1981 | |
| EP | 0145308 A2 | 6/1985 | |
| GB | 1194158 A | 6/1970 | |
| JP | H0585837 A | 4/1993 | |

* cited by examiner

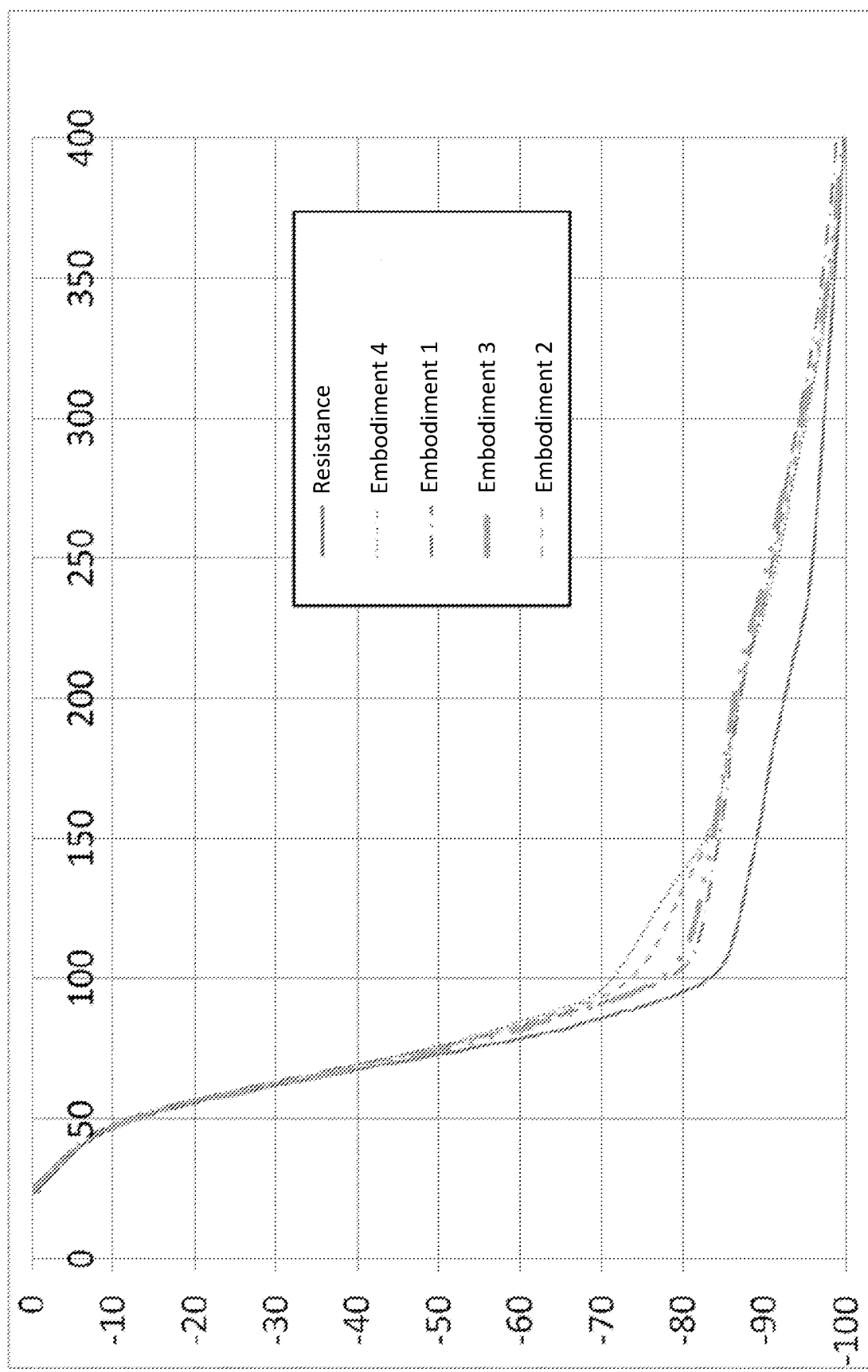

REFRACTORY CERAMIC BATCH AND METHOD FOR PRODUCING A REFRACTORY CERAMIC PRODUCT

The invention relates to a refractory ceramic batch and to a method for producing a refractory ceramic product.

The term "refractory ceramic product" within the sense of the invention denotes in particular refractory products having a working temperature of more than 600° C. and preferably refractory materials according to DIN 51060: 2000-6, that is to say materials with a pyrometric cone equivalent greater than SK 17. The pyrometric cone equivalent may be determined in particular in accordance with DIN EN 993-12:1997-06.

A "refractory ceramic batch", as is known, denotes a composition formed of one or more components or raw materials by which a refractory ceramic product can be produced by means of a thermal treatment, that is to say in particular by means of ceramic firing.

In order to process the unfired batch, said batch routinely comprises a binder which in particular can also be present in liquid form. When the batch is dried or heated, for example during ceramic firing, volatile constituents of such liquid binder escape at least in part from the batch, for example in gaseous form or in the form of vapour. If, however, volatile constituents of such liquid binder escape too quickly from the batch, this can damage the batch or the refractory ceramic product fired from the batch. For example, if volatile constituents of such liquid binder escape too quickly from the batch, this can lead to spalling or crack formation in the refractory ceramic product produced from the batch, whereby the usability of the product may suffer, for example on account of insufficient durability.

Such a risk of damage to the batch or the refractory ceramic product fired therefrom is also encountered in particular with the use of binders in the form of silica sol.

Thus, many efforts have been made to provide batches comprising a binder in the form of silica sol in which the risk of damage to the batch or the refractory ceramic product fired therefrom when the batch is dried or heated is reduced.

The object of the present invention is to provide a refractory ceramic batch which comprises a binder in the form of silica sol and which, when dried and heated, enjoys a reduced risk of damage to the batch or to the refractory ceramic product to be fired therefrom.

In order to achieve this object a refractory ceramic batch is provided in accordance with the invention, comprising the following components: a refractory basic component, a binder in the form of silica sol, and an alcoholic component in the form of one or more polyvalent alcohols. The silica sol is present here in the form of a colloidal suspension of polysilicic acid in water. Furthermore, the mass ratio of the refractory basic component to polysilicic acid is at least 10 and at most 55.

It has surprisingly been found in accordance with the invention that a refractory ceramic batch that solves the above-described problem can be provided if on the one hand it comprises said alcoholic component and on the other hand the polysilicic acid of the silica sol and the refractory basic component are provided in a specific mass ratio to one another. It has been found in accordance with the invention that with a mass ratio of the refractory basic component to polysilicic acid of at least 10 and most 55 it is possible to provide a batch which comprises a binder in the form of silica sol and which, when dried or heated, enjoys a reduced risk of damage to the batch or to the refractory ceramic product to be fired therefrom.

On the basis of the previous tests performed by the inventors, this effect of reduced damage to the batch or the refractory ceramic product to be fired therefrom when the batch according to the invention is dried or heated can be attributed in particular to the fact that, when the batch according to the invention is dried or heated, volatile components of the silica sol escape particularly slowly and uniformly, in particular more slowly and more uniformly than in batches comprising a binder in the form of silica sol which do not comprise the component according to the invention in the form of the alcoholic component or in which the mass ratio of the refractory basic component to polysilicic acid does not lie within the range according to the invention.

Silica sol, as is known, is a colloidal suspension of polysilicic acid formed from silicon dioxide in water.

In accordance with the invention the mass ratio of the refractory basic component to polysilicic acid, i.e. the ratio of the mass of the refractory basic component to the mass of the polysilicic acid of the binder in the batch according to the invention, lies in the range of from 10 to 55.

It has been found in accordance with the invention that volatile constituents of the binder escape from the batch according to the invention, during drying or heating thereof, increasingly more uniformly or increasingly slower if the mass ratio of the refractory basic component to polysilicic acid approaches a very specific range of at least 24 and at most 34.

In this regard, it can be provided that the mass ratio of the refractory basic component to polysilicic acid is at least 10, that is to say in particular for example also at least 11, 12, 13, 14, 15, 16, 17, 18, 19, 20, 21, 22, 23, or at least 24.

In this regard, it can also be provided that the mass ratio of the refractory basic component to polysilicic acid is at most 55, that is to say in particular for example also at most 52, 48, 44, 40, 36, 35, or at most 34.

In accordance with one embodiment it is provided that the mass ratio of the refractory basic component to polysilicic acid is at least 16 and at most 48. In accordance with a further embodiment it is provided that the mass ratio of the refractory basic component to polysilicic acid is at least 19 and at most 40. In accordance with a further embodiment it is provided that the mass ratio of the refractory basic component to polysilicic acid is at least 22 and at most 36. Lastly, in accordance with a further embodiment it is provided that the mass ratio of the refractory basic component to polysilicic acid is at least 24 and at most 34.

Based on the mass of the refractory basic component of the batch according to the invention, polysilicic acid is present in the batch for example in proportions ranging from 2 to 8 mass %, that is to say for example also in proportions of at least 2, 3, or 4 mass %, and for example also in proportions of most 8, 7, 6 or 5 mass %.

The mass ratio of the refractory basic component to silica sol in the batch according to the invention can be for example at least 5 and at most 25. In this regard, the mass ratio of the refractory basic component to silica sol can be for example at least 5, 6, 7 or 8 and for example at most 25, 24, 23, 22, 21, 20, 19, 18, 17, 16, 15, 14, 13, 12 or 11.

It has been found in accordance with the invention that volatile constituents of the binder escape from the batch according to the invention, during drying or heating thereof, even more uniformly or slowly if the mass ratio of the refractory basic component to silica sol in the batch lies within this range.

In accordance with one embodiment it is provided that the mass ratio of the refractory basic component to silica sol is at least 6 and at most 20. In accordance with one embodiment it is provided that the mass ratio of the refractory basic component to silica sol is at least 7 and at most 15. In accordance with a further embodiment it is provided that the mass ratio of the refractory basic component to silica sol is at least 8 and at most 11.

Based on the mass of the silica sol, polysilicic acid is present in the silica soul for example in proportions ranging from 30 to 50 mass %, that is to say for example also in proportions of at least 30, 31, 32, 33, 34, 35, 36, 37, 38, 39 or 40 mass %, and for example also in proportions of most 50, 49, 48, 47 or 46 mass %. In accordance with one embodiment it is provided that the mass proportion of the polysilicic acid in the silica sol is at least 36 and at most 48. In accordance with a further embodiment it is provided that the mass proportion of the polysilicic acid in the silica sol is at least 38 and at most 46.

It has been found in accordance with the invention that the advantageous properties of the batch according to the invention, that is to say in particular its good properties under drying and heating, can be further improved if the mass ratio of the polysilicic acid to the alcoholic component, that is to say the ratio of the mass of the polysilicic acid of the silica sol to the mass of the alcoholic component in the batch according to the invention, lies within a specific range of at least 3 and at most 16. The properties of the batch according to the invention can be further improved if this mass ratio increasingly approaches a specific range of at least 4 and most 12. In this regard, it can be provided that the mass ratio of the polysilicic acid to the alcoholic component is at least 3, 4 or 5 and for example at most 17, 16, 15, 14, 13 or 12.

Based on the mass of the refractory basic component, the alcoholic component can be present in the batch according to the invention for example in a proportion ranging from 0.2 to 1.8 mass %, that is to say for example also in a proportion of at least 0.2 mass %, 0.3 mass %, 0.4 mass % or 0.5 mass %, and for example also in a proportion of at most 1.8 mass %, 1.7 mass %, 1.6 mass %, 1.5 mass %, 1.4 mass %, 1.3 mass %, 1.2 mass %, 1.1 mass %, 1.0 mass %, 0.9 mass %, 0.8 mass %, or 0.7 mass %.

The batch according to the invention comprises an alcoholic component in the form of one or more polyvalent alcohols, in particular for example in the form of one or more of the following polyvalent alcohols: one or more divalent alcohols or one or more trivalent alcohols.

Trivalent alcohols can be present in particular in the form of one or more aliphatic trivalent alcohols, for example in the form of glycerol.

The alcoholic component is preferably present in the form of one or more divalent alcohols, in particular in the form of at least one of the following divalent alcohols: monoethylene glycol, diethylene glycol, 1,2-propylene glycol, 1,2-propylene glycol, 1,3-propylene glycol, or dipropylene glycol.

The alcoholic component is particularly preferably present in the form of at least one of the following divalent alcohols: monoethylene glycol or diethylene glycol.

The refractory basic component consists of one or more refractory raw materials. In principle, the refractory basic component can consist of one or more arbitrary refractory raw materials, which can be present in refractory ceramic batches. The refractory basic component, however, preferably consists of one or more non-basic raw materials.

As is known, non-basic raw materials are based on at least one of the oxides $SiO_2$, $Al_2O_3$, $ZrO_2$, $Cr_2O_3$ or the carbide SiC. In this regard, it can be preferred if the refractory basic component of the batch according to the invention consists of one or more raw materials based on at least one of the following substances: $SiO_2$, $Al_2O_3$, $ZrO_2$, $Cr_2O_3$ or SiC.

These substances can be present in each case in the form of raw materials of one of these substances, for example quartz ($SiO_2$), quartz glass ($SiO_2$), corundum ($Al_2O_3$), zirconia ($ZrO_2$) or silicon carbide (SiC), and/or in the form of raw materials of a number of these substances, for example fireclay ($SiO_2$, $Al_2O_3$), mullite ($SiO_2$, $Al_2O_3$) or zircon ($ZrO_2$, $SiO_2$).

In accordance with one embodiment it is provided that the refractory basic component consists to an extent of at least 90 mass %, in relation to the total mass of the refractory basic component, of one or more raw materials based on at least one of the following substances: $SiO_2$, $Al_2O_3$, $ZrO_2$, $Cr_2O_3$ or SiC.

In accordance with one embodiment it is provided that the refractory basic component comprises one or more of the following raw materials: quartz, quartz glass, fused silica, microsilica, fireclay, mullite, mullite-rich raw materials, andalusite, crushed porcelain, bauxite, sintered corundum, alumina, zirconia, zircon, kyanite, sillimanite, chromium ore or SiC. In accordance with one embodiment it is provided that the refractory basic component consists to an extent of at least 90 mass %, in relation to the total mass of the refractory basic component, of one or more of the above-mentioned raw materials.

In accordance with one embodiment it is provided that the refractory basic component, besides the above-mentioned raw materials, also comprises one or more of the following raw materials: alumina cement, carbon carriers, antioxidants (in particular metallic components, in particular at least one of the following components, preferably in powder form: metallic aluminium or metallic silicon), bonding clay or steel needles. For example, it can be provided that the refractory basic component comprises the above-mentioned further raw materials in a proportion ranging from 0 to 10 mass % in relation to the total mass of the refractory basic component, that is to say for example also in a proportion ranging from 1 to 10 mass %, or in a proportion ranging from 1 to 5 mass %.

In accordance with one embodiment it is provided that the refractory basic component consists to an extent of at least 90 mass %, in relation to the total mass of the refractory basic component, of one or more of the following substances: $SiO_2$, $Al_2O_3$, $ZrO_2$, $Cr_2O_3$ or SiC. As already mentioned, these oxides in turn can be present in the form of the pure oxides or in the form of compounds of a number of these oxides.

It has been found in accordance with the invention that the batch can react very sensitively to further components which are present in the batch in addition to the above-mentioned components. In particular, the drying and heating properties of the batch may be impaired by further components. In accordance with one embodiment it is therefore provided that the batch, in addition to the above-mentioned components, that is to say in addition to the refractory basic component, the binder in the form of silica sol and the alcoholic component, also comprises further components in a proportion less than 10 mass %, that is to say for example also in a proportion less than 5 mass %, or in a proportion less than 2 mass j, in each case in relation to the total mass of the batch.

The refractory ceramic batch according to the invention can be used in principle arbitrarily or can be treated for the production of a refractory ceramic product. The refractory ceramic batch according to the invention is preferably used for the production of an un-shaped refractory ceramic product, that is to say in the form of an un-shaped refractory ceramic material, that is to say in the form of what is known as a refractory ceramic mass.

A method for producing a refractory ceramic product from the refractory ceramic batch according to the invention comprises the following steps:
providing a batch according to the invention;
heating the batch to form a refractory ceramic product.

The batch according to the invention is particularly preferably fired to form an un-shaped refractory ceramic product.

The heating of the batch may therefore constitute a ceramic firing, that is to say a thermal treatment, with which the refractory basic component, that is to say the refractory raw materials of the batch, are sintered with one another to form a refractory ceramic product. The refractory ceramic product that can be fired from the batch according to the invention may therefore constitute a sintered product.

The firing can be performed at the temperatures suitable for sintering of the raw materials of the basic component, for example at a temperature ranging from 1200 to 1600° C., in particular for example at a temperature ranging from 1250 to 1500° C.

As already mentioned, the batch according to the invention is preferably treated in the form of a refractory mass. In this regard, it can preferably be provided that the batch is not shaped, i.e. for example pressed, prior to its firing. Rather, the batch is applied un-shaped to a surface of an aggregate, for example a portion of the refractory lining of an industrial furnace, and is then fired there, in particular by heating of the aggregate.

Further features of the invention will become clear from the claims, the following description of a practical example of the invention, the drawings, and the associated description of the drawings.

All of the features of the invention can be combined arbitrarily with one another, individually or in combination.

Four practical examples of a batch according to the invention will be explained hereinafter in greater detail in accordance with practical examples 1 to 4 described hereinafter.

BRIEF DESCRIPTION OF THE DRAWINGS

FIG. 1 shows drying curves for batches according to the invention in accordance with practical examples 1 to 4 and the drying curve for a batch not according to the invention.

DETAILED DESCRIPTION

The batches according to practical examples 1 to 4 consisted in each case of the following components: a refractory basic component, a binder in the form of silica sol, an alcoholic component in the form of monoethylene glycol or diethylene glycol, and fibres.

The refractory basic component consisted in each case of the following refractory ceramic raw materials in the following mass proportions, in each case in relation to the total mass of the refractory basic component:
fireclay (up to 6.30 mm): 82 mass %;
calcined alumina: 16 mass %;
microsilica: 2 mass %.

The fibres were provided in the form of polypropylene fibres in a mass proportion of 0.05 mass % in relation to the total mass of the refractory basic component (without the polypropylene fibres).

Furthermore, silica sol was present in the batches according to practical examples 1 to 4 in a mass proportion of 9.5 mass % in relation to the total mass of the refractory basic component (without the silica sol). The silica sol was present in the form of a colloidal suspension of polysilicic acid in water. The mass proportion of polysilicic acid in the silica sol, in relation to the total mass of the silica sol, was 40 mass %. The mass ratio of the refractory basic component to polysilicic acid was therefore 26.32.

Based on the mass of the refractory basic component, the polysilicic acid was therefore present in the batch in a proportion of 3.8 mass %.

Furthermore, the mass ratio of the refractory basic component to silica sol was therefore 10.53.

The batches according to practical examples 1 to 4 differed in respect of the type and proportion of alcoholic component present therein.

In the batches according to practical examples 1 and 2, an alcoholic component in the form of monoethylene glycol was present, whereas in practical examples 3 and 4 an alcoholic component in the form of diethylene glycol was provided.

In order to achieve the most uniform distribution possible of the alcoholic component over each separate batch, the alcoholic component was mixed with the silica sol before the silica sol was then mixed with the further components to form the batches according to the practical examples.

In accordance with practical example 1 the monoethylene glycol was present dissolved in the silica sol in a proportion of 5 mass % in relation to the mass of the silica sol without the monoethylene glycol. This resulted in a mass ratio of polysilicic acid to monoethylene glycol in the batch of 8.

In accordance with practical example 2 the monoethylene glycol was present dissolved in the silica sol in a proportion of 10 mass % in relation to the mass of the silica sol without the monoethylene glycol. This resulted in a mass ratio of polysilicic acid to monoethylene glycol of 4.

In accordance with practical example 3 the diethylene glycol was present dissolved in the silica sol in a proportion of 5 mass % in relation to the mass of the silica sol without the diethylene glycol. This resulted in a mass ratio of polysilicic acid to diethylene glycol in the batch of 8.

Lastly, in accordance with practical example 4 the diethylene glycol was present dissolved in the silica sol in a proportion of 10 mass % in relation to the mass of the silica sol without the diethylene glycol. This resulted in a mass ratio of polysilicic acid to diethylene glycol of 4.

The accordingly formulated batches were mixed thoroughly and then heated with a uniform heating rate of approximately 1° C. per minute to approximately 400° C.

The corresponding drying curves for the batches according to the above-described practical examples 1 to 4 are shown in FIG. 1. Here, the temperature reached is plotted on the abscissa and the weight loss of the batch upon reaching the temperature specified on the abscissa, in relation to the total mass of the volatile constituents of the batch, is plotted on the ordinate. The total weight loss was standardised to 100%.

It can be clearly seen that all four batches according to practical examples 1 to 4 registered approximately 90% of their weight loss up to a temperature of approximately 230° C. This is attributed to the fact that the majority of the volatile components of the silica sol volatilised in vapour form up to this temperature.

For comparison of the drying properties of the batches according to practical examples 1 to 4 with a batch according to the prior art, a further batch was produced which corresponded largely to the batch according to practical examples 1 to 4, but with the sole difference that the batch according to the comparative example did not comprise an alcoholic component.

As can be seen from the drying curve for this batch in FIG. 1 (denoted by "prior art"), this batch registered approximately 90% of its weight loss already up to a temperature of approximately 160° C.

In the event of heating, the batches according to the invention according to practical examples 1 to 4 thus release the majority of their volatilisable constituents of the binder more slowly than the batch according to the comparative example, whereby, in the batches according to the invention according to practical examples 1 to 4, the risk of damage to the batches or the refractory ceramic products to be produced therefrom is significantly reduced.

The invention claimed is:

1. A refractory ceramic batch comprising the following features:
   1.1 the batch comprises the following components
      1.1.1 a refractory basic component;
      1.1.2 a binder in the form of silica sol;
      1.1.3 an alcoholic component in the form of one or more polyvalent alcohols;
   1.2 the silica sol is present in the form of a colloidal suspension of polysilicic acid in water;
   1.3 the mass ratio of the refractory basic component to polysilicic acid is at least 10 and at most 55;
   1.4 the polyvalent alcohols are present in the form of one or more of the following polyvalent alcohols: one or more divalent alcohols or one or more trivalent alcohols.

2. The batch according to claim 1, wherein the mass ratio of the refractory basic component to polysilicic acid is at least 16 and at most 48.

3. The batch according to claim 1, wherein the mass ratio of the refractory basic component to polysilicic acid is at least 19 and at most 40.

4. The batch according to claim 1, wherein the mass ratio of the refractory basic component to polysilicic acid is at least 24 and at most 34.

5. The batch according to claim 1, wherein the mass ratio of the refractory basic component to silica sol is at least 5 and at most 25.

6. The batch according to claim 1, with polyvalent alcohols in the form of one or more divalent alcohols.

7. The batch according to claim 1 with divalent alcohols in the form of at least one of the following divalent alcohols: monoethylene glycol, diethylene glycol, 1,2-propylene glycol, 1,3-propylene glycol or dipropylene glycol.

8. The batch according to claim 1, with divalent alcohols in the form of at least one of the following divalent alcohols: monoethylene glycol or diethylene glycol.

9. The batch according to claim 1, wherein the mass ratio of the polysilicic acid to alcoholic component is at least 3 and at most 16.

10. The batch according to claim 1, wherein the refractory basic component consists of one or more raw materials on the basis of at least one of the following substances: $SiO_2$, $Al_2O_3$, $ZrO_2$, $Cr_2O_3$ or SiC.

11. The batch according to claim 1, wherein the refractory basic component consists to an extent of at least 90 mass % of one or more of the following substances: $SiO_2$, $Al_2O_3$, $ZrO_2$, $Cr_2O_3$ or SiC.

12. A method for producing a refractory ceramic product, said method comprising the following features:
   12.1 providing a batch, the batch comprises:
      a refractory basic component;
      a binder in the form of silica sol;
      an alcoholic component in the form of one or more polyvalent alcohols;
      wherein the silica sol is present in the form of a colloidal suspension of polysilicic acid in water; and
      wherein the mass ratio of the refractory basic component to polysilicic acid is at least 10 and at most 55;
      wherein the polyvalent alcohols are present in the form of one or more of the following polyvalent alcohols: one or more divalent alcohols or one or more trivalent alcohols; and
   12.2 heating the batch to form a refractory ceramic product.

* * * * *